US012790029B2

(12) United States Patent
Francis et al.

(10) Patent No.: US 12,790,029 B2
(45) Date of Patent: Nov. 10, 2026

(54) PROCEDURE FOR THE EFFICIENT SAMPLING OF A FLIGHT ENVELOPE

(71) Applicant: NORTHROP GRUMMAN SYSTEMS CORPORATION, Falls Church, VA (US)

(72) Inventors: Michael Francis, Melbourne, FL (US); Anton S. VanderWyst, Melbourne, FL (US); Christopher S. Charles, Palm Bay, FL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 224 days.

(21) Appl. No.: 18/924,160

(22) Filed: Oct. 23, 2024

(65) Prior Publication Data

US 2026/0109482 A1 Apr. 23, 2026

(51) Int. Cl.

| | |
|---|---|
| ***B64F 5/60*** | (2017.01) |
| ***G01M 9/00*** | (2006.01) |
| ***G06F 30/15*** | (2020.01) |
| ***G06F 30/20*** | (2020.01) |
| ***G06F 111/08*** | (2020.01) |

(52) U.S. Cl.

CPC ................ *B64F 5/60* (2017.01); *G01M 9/00* (2013.01); *G06F 30/15* (2020.01); *G06F 30/20* (2020.01); *G06F 2111/08* (2020.01)

(58) Field of Classification Search

CPC .. B64F 5/60; G01M 9/00; G06F 30/20; G06F 2111/08; G06F 30/15

See application file for complete search history.

(56) References Cited

U.S. PATENT DOCUMENTS

| | | | | |
|---|---|---|---|---|
| 9,390,383 B2 | 7/2016 | Harik | | |
| 2020/0063665 A1* | 2/2020 | Ma | ......................... | G06N 3/044 |
| 2024/0220868 A1* | 7/2024 | Verbeke | ................. | G06N 3/098 |

OTHER PUBLICATIONS

Bernhard E. Boser, et al. A Training Algorithm for Optimal Margin Classifiers, Jul. 1, 1992, pp. 144-152, Association for Computing Machinery.

(Continued)

*Primary Examiner* — Peter J Macchiarolo
*Assistant Examiner* — John M Royston
(74) *Attorney, Agent, or Firm* — John A. Miller; Shumaker, Loop & Kendrick, LLP

(57) ABSTRACT

A system and method for sampling a flight envelope of an air vehicle under test. The method includes obtaining engineering models of the vehicle to identify how the vehicle behaves, obtaining empirical models through test data, and obtaining historical models of similar legacy aircraft. The method further includes ensembling the models into an integrated model and assessing the ensemble uncertainty at any particular test point, for a variety of aircraft conditions, to determine model reliability. The method includes determining the optimal order of test points based on local model uncertainty, testing the air vehicle at a point, revising the integrated model with that data and reassessing the uncertainty, and determining if a stop testing condition has been met, in which case the testing series is closed. The last calibrated integrated model could then be used to generate trusted data for any remaining required test using a certification by analysis method.

19 Claims, 4 Drawing Sheets

(56) References Cited

OTHER PUBLICATIONS

Seitz, Sarem. “Mixtures of Gaussian Processes for regression under multiple prior distributions.” 2021 arXiv preprint arXiv: 2104. 09185.
Klempay Oscar T: “Flight Test Point Optimization Program for a Self-Protection Application,” Research article, pp. 1-11, Retrieved May 11, 2026, Embry-Riddle Aeronautical University website, Feb. 4, 2022, Georgia Institute of Technology, Atlanta, Georgia 30332, United States of America.
Tucker, Aaron A. et al.: “Application Design of Experiments to Flight Test: A Case Study.” Journal of Aircraft, vol. 47, No. 2, Mar.-Apr. 2010.
He Yuning: “Online detection and modeling of safety boundaries for aerospace applications using active learning and Bayesian statistics,” 2015 International Joint Conference on Neural Networks (IJCNN), IEEE, Jul. 12, 2025, pp. 1-8.

* cited by examiner

PROCEDURE FOR THE EFFICIENT SAMPLING OF A FLIGHT ENVELOPE

BACKGROUND

Field

This disclosure relates generally to a system and method for the optimization and minimization of the required sampling of a flight envelope for an air vehicle under test and, more particularly, to a system and method for efficiently sampling the flight envelope of an air vehicle that is guided by the inclusion of all possible sources of information (predictive modeling, and legacy and current aircraft test data), integrating the individual discipline models using an ensembling method to create a single performance model bounded by an uncertainty quantification, and using the uncertainty quantification to determine what the next sample point should be for testing the air vehicle.

Discussion of the Related Art

Air vehicles or aircraft are generally complex machines with many components and systems, and come in many designs. An aircraft flight envelope refers to the limits of capability of an aircraft design in terms of altitude, airspeed, G-load, angle of attack or other combination of factors affecting mission performance or safety of flight. An aircraft's allowed flight envelope is determined by testing the aircraft, i.e., flying the aircraft under various airspeeds, altitudes and loads to determine the capabilities and limits of the aircraft, and is generally referred to as sampling a flight envelope. However, such testing to determine an aircraft's flight envelope traditionally requires copious amounts of testing without necessarily considering in what order to perform the tests, when to perform the tests, how much testing should be performed, when testing can be or should be done digitally, etc., which is very expensive. The aim of this method is to provide a new tool by which the test organization can accurately consider these questions using the results as "a priori" information regarding expected aircraft performance, bounded by uncertainty in such a way as to guarantee the results of the test do indeed fall within the predicted range of the model output, to then decide if the test series is necessary and if so, to what extent. The remainder of "required" test points would then be certified by analysis through use of the ensemble model.

SUMMARY

The following discussion discloses and describes a system and method for sampling a flight envelope of an air vehicle under test. The method includes obtaining engineering models of the air vehicle, across all design disciplines, to identify how the air vehicle should behave "as designed", obtaining empirical models of the air vehicle created from measurement data taken from testing the air vehicle, and obtaining historical models from similar legacy air vehicles derived from the measurement data taken from their full testing campaign. The method further includes ensembling the engineering models, the empirical models and the historical models into an integrated model and quantifying the overall uncertainty of the integrated model to determine its reliability, where the uncertainty quantification is a bounded value in which the future test point should statistically lie. The method also includes determining optimal testing sample points of the air vehicle based on the uncertainty quantification, where the testing point is dependent on the altitude and airspeed of the air vehicle (or other combination of test factor conditions), testing the air vehicle at the ideal sample point, revising the integrated model and reassessing the uncertainty quantification based on the test measurement, and determining if a stop testing condition has been met. The method includes conducting the steps above in an iterative fashion if the stop testing condition is not met, and doing so until it is.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for sampling a flight envelope of an air vehicle that includes obtaining air vehicle information from all possible sources, integrating individual models using an ensembling method to create an integrated model having an uncertainty quantification, and determining what the next sample point should be for testing the air vehicle using the uncertainty quantification as a metric for decision making is merely exemplary in nature, and is in no way intended to limit the disclosure or its applications or uses.

Figure 1:
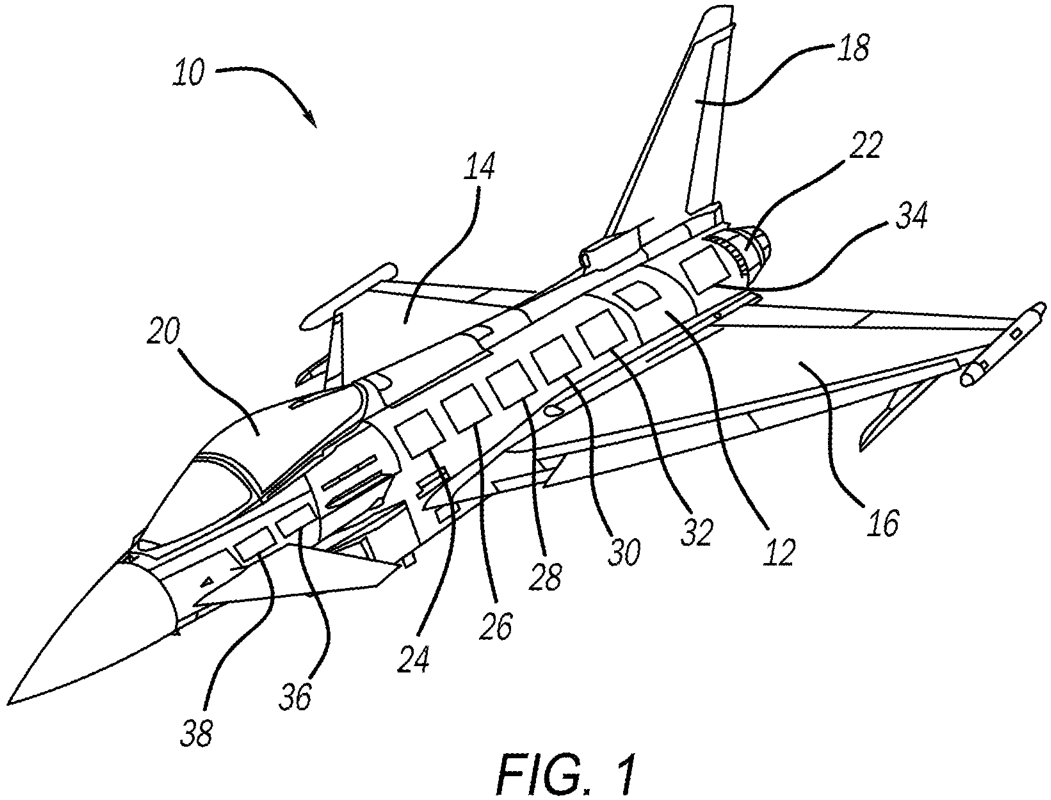
FIG. 1 is an isometric view of a military type aircraft.

FIG. 1 is an isometric view of an aircraft 10 that includes a fuselage 12, wings 14 and 16, a tail 18, a cockpit 20 and an engine 22, where the aircraft 10 is intended to represent any aircraft that can benefit from the discussion herein. The aircraft 10 also includes a number of aircraft systems and subsystems that typically fall into three basic categories, namely, systems that provide flight critical functions, mission critical functions and non-essential functions. Those systems and subsystems include, but are not limited to, a fuel system 24, an aerodynamic system 26, a hydraulics system 28, an environmental control system (ECS) 30, a propulsion system 32 and a vehicle management system (VMS) 34. The aircraft 10 also includes non-essential loads 36, such as lighting, that are not required to keep the aircraft 10 flying and a gearbox 38 that reduces or controls the rotational speed of the aircraft engine 22. The operation of these systems and subsystems, and other systems and subsystems on the aircraft 10, is well understood by those skilled in the art, and all need to be tested for performance and reliability.

It is noted that the methodologies described herein are not limited to military or performance type aircraft, or fixed-wing platforms or necessarily air breathing engines. All forms of air vehicles or those that must maintain a certain amount of maneuverability and performance reliability, as they transition through the atmosphere, are benefited from these testing optimization approaches.

This disclosure describes a system and method for testing an air vehicle, such as an aircraft, that integrates information from all available sources into an estimate of vehicle performance, uncertainty in that performance at a specific point in the vehicle flight envelope sampling space, and allows the determination of a sample point based on the local uncertainty quantification or global cumulative uncertainty of the model within the vehicle flight envelope. The system and method obtain information from all possible sources, referred to herein as individual models, integrating the individual models using an ensembling method to create an integrated model, and an optimization for determining what the next sample point should be, where the process is iterative.

In conjunction with a physics-based compilation of fully coupled models, the benefits from taking this holistic approach to air vehicle testing is expected to yield efficiencies in the planning, execution, and evaluation phases of aircraft tests. It will also contribute to a more complete data-driven decision-making capability for program management. Fully coupling the ensemble including environmental parameters and calculations shared between the various individual models in a temporal manner and updating/fine-tuning the ensemble with current flight test data, allows for higher accuracy, lower uncertainty, and subsequent better utilization of the results. Knowledge and the identification of areas of high model uncertainty (as compared to recorded instrument data and its associated uncertainty) will guide improvements to the modeling and when/if the model answer should be used in-lieu of flight tests. In addition, results of the expected flight test data prior to flight and/or the comparison of the ensemble models' predictions post-flight are expected to enhance future flight test planning efforts. These capabilities will result in a cost savings both in terms of time and expense associated with traditional air vehicle testing. In short, these methods of optimization will result in an unambiguous, quantifiable decision metric that allows for a determination of when enough testing has been accomplished to satisfy the desired requirements. To accomplish this with less actual flight test data, while still maintaining historic coverage of expected flight regimes and conditions, will require a more flexible adaptive design of experiments type sampling across the parameter space of the envelope compared to traditional test regimes.

The characterization, tracking, association, and combination (propagation) of uncertainty of the model inputs over a variety of flight conditions to the outputs of the larger, more complex ensemble model, will allow for a better understanding of the system-of-systems total aircraft interactions and performance responses. By starting with a high-fidelity, physics-based model of these interactions, accurate predictive modeling will also be possible in areas that have little or no current flight test data associated with them. This, combined with close to real-time calibration of the ensemble with flight test-measured values, will allow for high confidence upper and lower bounding of the ensemble outputs over the entire range of expected aircraft operations.

Historically, additional model development tapers off after the aircraft design phase and is rarely used to this extent during the actual flight test phase of development. Test engineers then commonly implement traditional testing plans and patterns that may not be optimized. The proposed mathematical ensemble method and its notional use described below will offer accurate and up-to-date predictive information and decision-making capabilities with a high degree of accuracy.

The individual models referred to above fall into three major categories, namely, empirical models representing the data taken from an individual vehicle, historical models representing past vehicles of the same type, and engineering models representing different models of how the vehicle might behave.

The empirical models are meant to capture the measured performance of a single air vehicle, n. The vehicle has some functional performance parameter prediction $Y_{emp.n}$ on some input domain $\Omega_X$ and has some probability density function $\rho_{emp.n}$ for determining the upper and lower ranges of the functional response to within a specified confidence interval in reference to said functional model response. Either the vehicle performance $Y_{emp.n}$ or the domain $\Omega_X$ may be multivariate, and the measurements of both may have uncertainty, where both are normally the case. The empirical model can be created using statistical, machine learning, or artificial intelligence methods to predict $Y_{emp.n}(\Omega_X)$ and $\rho_{emp.n}(\Omega_X)$, and are treated as a 'black box' mathematical representation of the particular aircraft's actual measured performance. These models' effective range of useability will change over time as more test data is collected from the single vehicle and used to update any prior empirical representation. The most common methods for the creation of these models are the polynomial chaos expansion (PCE) method for $Y_{emp.n}(\Omega_X)$ and Gaussian process uncertainty quantification techniques for the determination of $\rho_{emp.n}(\Omega_X)$. Although these are the most common methods for training $Y_{emp.n}(\Omega_X)$ and $\rho_{emp.n}(\Omega_X)$, any possible combination of statistical methods can be employed, with examples being the polynomial chaos expansion, polynomial, exponential, and physics informed neural networks for fitting $Y_{emp.n}(\Omega_X)$, where examples include Gaussian uncertainty quantification and adaptive chaos expansion for fitting $\rho_{emp.n}(\Omega_X)$. The vehicle specific model is complete when the sampling of the individual vehicle is complete.

The historical models are meant to capture the performance of all previous vehicles of the same vehicle type. The historical record of vehicle type has some average performance parameter $Y_{hist}$ on some input domain $\Omega_X$ and has some probability density function $P_{hist}$. This gives the historical models $Y_{hist}(\Omega_X)$ and $P_{hist}(\Omega_X)$, as historical fleet analogs to the single vehicle models $Y_{emp.n}(\Omega_X)$ and $\rho_{emp.n}(\Omega_X)$. The historical models are free to use statistical, machine learning, or artificial intelligence methods to predict $Y_{hist}(\Omega_X)$ and $\rho_{hist}(\Omega_X)$, and are also treated as a 'black box' with information only from the historical fleet sample.

The engineering models are meant to capture the broad category of science and engineering parameterized models of an air vehicle. Given that there is more than one way to model a system, the number of engineering models possible is not bounded. The three most common engineering models are finite element models (FE), vehicle management systems (VMS) and digital twins (DTws). Finite element models are a class of numerical techniques that define vehicle performance based on partial differential equations, such as the Navier Stokes equations. The result of finite element models is an engineering model $Y_{eng.FE.n}(\Omega_X)$ with a relatively narrow dispersion $\rho_{eng.FE.n}(\Omega_X)$ both of which may need to be adjusted and calibrated for unmodeled, unknown effects which may present themselves during test. Vehicle management systems (VMS) are a category of engineering models that represent vehicle performance and are sufficiently rapid so that they can be put inside onboard computer systems. These VMS models have their own model predictions $Y_{eng,VMS.n}(\Omega_X)$ with a dispersion $\rho_{eng,VMS,n}(\Omega_X)$ and can be calibrated with flight test data. Digital Twin (DTw) models are a new generation of engineering models that integrate statistical and machine learning methods to create their own model predictions $Y_{eng,DTw.n}(\Omega_X)$ and dispersions $\rho_{eng,DTw.n}(\Omega_X)$ of the complex combination of the vehicle specific, engineering, VMS, and historic models to uncover system-of-systems interactions. The DTws are meant to be run over a larger input space of variables, both in number of inputs and the range of those inputs. This leads to many, many more digital evaluations of an aircraft's performance across the design space than could have been achieved with physical build and testing alone. These three examples of engineering models make clear that the number of engineering models is determined by the ever-expanding state of engineering, science, and computation, thus making it necessarily vague in number and origin.

The three model types discussed above therefore provide $Y_{emp.n}(\Omega_X)$, $Y_{hist}(\Omega_X)$, and various $Y_{Eng.type.n}(\Omega_X)$ as models of vehicle performance, with their $\rho_{emp.n}(\Omega_X)$, $P_{hist}(\Omega_X)$, and various $\rho_{Eng.type.n}(\Omega_X)$ probability densities. Thus, since several models of vehicle performance are provided on the flight envelope, the question becomes how to combine all of these models to create a best guess of vehicle performance.

Model ensembling as used herein refers to a broad class of methods that are used to combine multiple model types into an integrated model $Y_{int}(\Omega_X)$. Model ensembling must be performed at each step when any new model is created or a previously used model is updated. A new empirical model is updated at each sample point (with the previous version archived), a new historical model is created at the end of vehicle sampling, and a new engineering model may be contributed based on other factors, such as equipment configuration changes or additions. This creates a structure and schedule to model updating and ensembling. If there are n vehicles, each with some type of test index i, and vehicle configuration v, and there is a progression through the sample space of each vehicle s the total samples of data associated with the vehicle n then have an index of i, v, s leading to a total test data set structure of $\Sigma_{i,v,s}$. Of note, the test data may come from a digital model and not from physical test. This structure allows for integrated models, per vehicle n, of the form: $Y_{int}(\Omega_X, n)$ and $\rho_{int}(\Omega_X, \Sigma_{i,v,s}, n)$, dependent on the cumulation of all pertinent test data collected, to be implemented before a single sample is recorded from physical test using just the engineering and historic models. When a physical test is then conducted, the empirical model is either created or updated, and then re-ensembled with the integrated model, when the vehicle test is complete the historical model is updated. If both the empirical and historical models are updated, a new integrated model is created with the ensembling algorithm. There are several ensembling algorithms that could be employed, where the most common is a mixing of Gaussian processes, which can be implemented in many ways. It is only important that ensembling occurs to generate $Y_{int}(\Omega_X, n)$ and $\rho_{int}(\Omega_X, \Sigma_{i,v,s}, n)$.

Using the integrated model of the functional response $Y_{int}(\Omega_X, n)$, and a model of the probability density of that response, $\rho_{int}(\Omega_X, \Sigma_{i,v,s}, n)$, it is now possible to assemble a sampling protocol. Combining the value of the functional response $Y_{int}(\Omega_X, n)$, and the probability density function $\rho_{int}(\Omega_X, \Sigma_{i,v,s}, n)$, allows for an estimate of the uncertainty, $\sigma$, about a particular point. From the probability density function, a local uncertainty in $Y_{int}$ as $\sigma[Y_{int}(\Omega_X, n), \rho_{int}(\Omega_X, \Sigma_{i,v,s}, n)]$ can be derived. This uncertainty function is the lens through which the stop condition for sampling will be viewed. It may be the case that it is undesirable that $\sigma$ at any point exceeds a global value $\sigma_{max}$ or it may be the case that a domain defined uncertainty exists that is constrained $\sigma_{crit}$. The space is then sampled until a stop condition is met. There are many possible stop conditions. In practice, stop conditions on a particular $\sigma$ are set by contract or customer representatives. With the stop condition set, the remaining decision is where to start, and from the starting information, how to proceed, which is a classic design of experiments. Several sampling protocols are possible, such as systematic sampling, random sampling, iterative random sampling, cluster sampling, stratified sampling, etc. The most commonly implemented sampling protocol is the steepest descent sampling method, where the sampling starts at a first sample, and then sample the nearest input variable point on domain $\Omega_X$ that exceeds the uncertainty requirement. The stop condition and the decided sample method together make the final pieces of the process.

Figure 2:
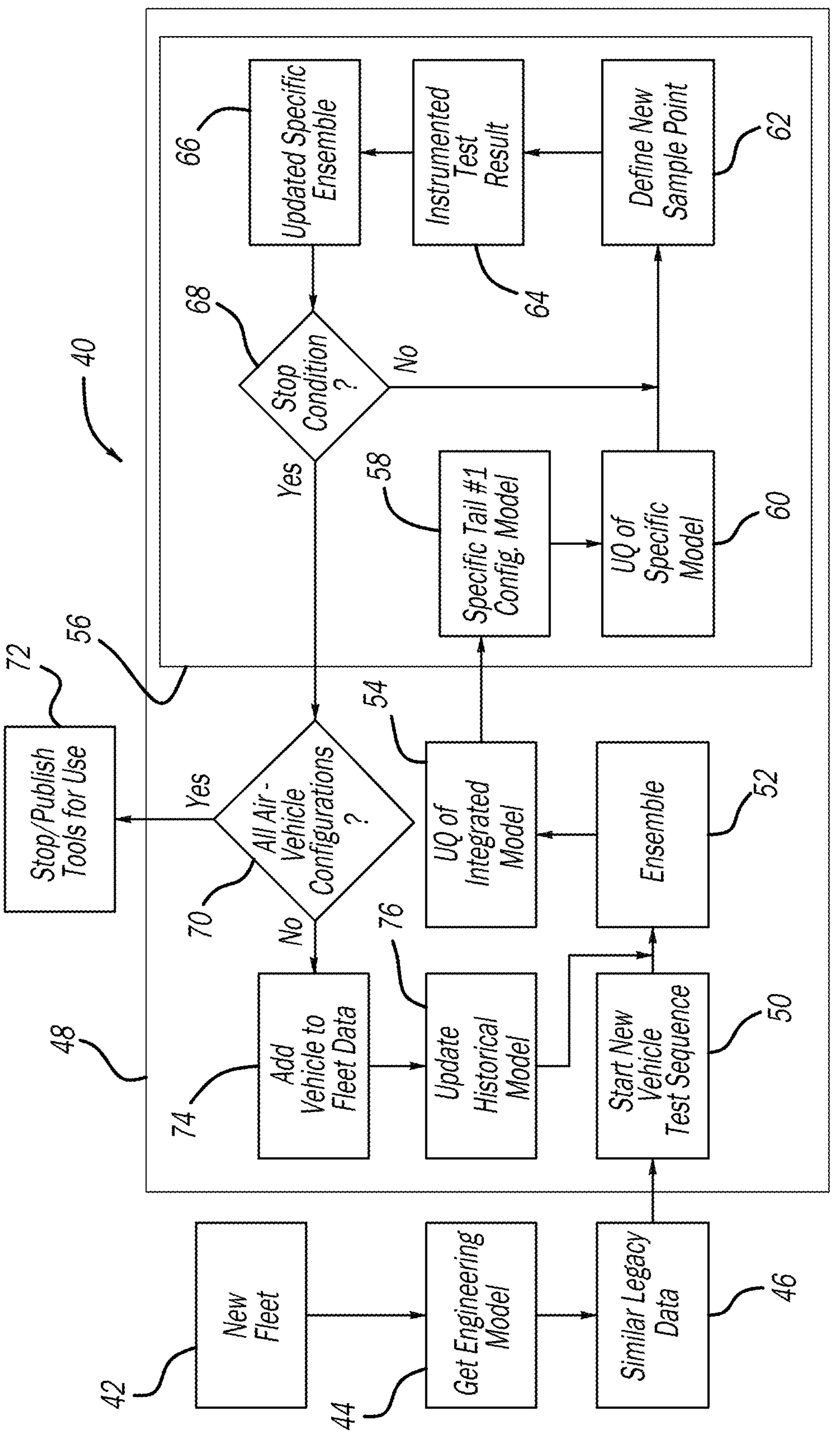
FIG. 2 is a block diagram of a controller architecture for sampling a flight envelope of an air vehicle under test that employs model ensembling and updating when new test data becomes available for both the tail number specific and the fleet aircrafts models.

FIG. 2 is a block diagram of a controller architecture 40 for sampling a flight envelope of an air vehicle, or a fleet of related air vehicles, under test that employs model ensembling, as described herein. The specific fleet of air vehicles is identified at box 42. For the first air vehicle being tested of a fleet of air vehicles, engineering models of the vehicle may or may not exist. However, since the aircraft ostensibly went through a design process, they should. If the engineering models do exist, then they are obtained at box 44. Similarly, legacy data from previous air vehicles within the same class as the new fleet vehicle is obtained at box 46. Using the engineering models that are available and legacy data, the process enters a fleet loop sequence 48 and a new vehicle test protocol is started at box 50. This means that the engineering model may be a null set, as well as the empirical model. Historical models from similar, legacy type aircraft may or may not exist. Using the engineering models that are available, those models are ensembled to create an integrated model-based test and evaluation (MBTE) DTw model on which an uncertainty quantification (UQ) analysis can be conducted at box 52, where the UQ is a plus/minus percentage that a particular data point is accurate to within some confidence interval (CI). The UQ is assessed at box 54 to determine the reliability of the integrated model at the various sample points, discussed below. Every air vehicle in a fleet of air vehicles of the same type are different, and thus will perform slightly differently. As more vehicles in the fleet are tested, the integrated model becomes more accurate, and the UQ bounds should narrow. However, it is recognized that these uncertainty bounds are fundamentally limited to a maximum lower magnitude because of the individual aircraft performance variations.

The integrated MBTE model provides an average of the performance for the fleet of air vehicles. For subsequent air vehicles being tested, various inputs are provided to generate the integrated model discussed above and include historic knowledge and design, design and engineering multi-physics models and test data inclusion from an "as built" air vehicle. UQ is the driving factor that makes the test optimization work. UQ is essentially a bounding value, and is obtained at every level of the air vehicle testing including component level, subsystem level, system level, ground level, etc. The basis of the integrated MBTE model is hi-fidelity, multi-physics simulations, covering a wide range of expected air vehicle configurations, test conditions and flight dynamics. The understanding of and inclusion of all sources of uncertainty into the models is key to the successful implementation of the optimization method. Ensembling all available models and appropriately including historic and current flight test data can create a generalized calibrated predictive model, where predictive means that the true value is known to fall within the UQ bounds even in regions that do not have test data because of the underlying original physics basis. Thus, knowing these things, a more efficient/optimal direct test can be obtained to close any wide UQ gaps, or determine if and where the testing is actually not needed. Once the UQ is small enough, as agreed upon by the customer stakeholders, the flight test data calibrated ensemble (or integrated model) can be reliable to be used as an 'in-lieu-of' substitution tool, thus eliminating the need for further physical test of the vehicle.

Various UQ analyzing techniques can be employed to assess the UQ and the reliability of the integrated model. Some of those techniques include a Monte Carlo (MC) type model input analysis to provide the range of numeric predictions, where the deviations from expected nominal value can be systematic and/or random, where systematic includes observational, environmental and instrumental, and random includes theory and technique. Another is model theory that includes statistical, sensitivity and physical, where statistical includes sample-based, reliability-based and variance-based. Another is expression that includes probabilistic, scenario information and risk index. Another is prediction horizon that includes ultra short term, short term and long term. Another is AIT that includes deep learning, evolutionary algorithms and hybrid modeling. Deep Learning can include Bayesian techniques, such as Bayesian neural networks, Monte Carlo dropout, Markov chain Monte Carlo, Bayesian active learning, variational inference, Bayes by backprop and variational autoencoder. Others include ensemble techniques, such as deep ensemble, deep ensemble Bayesian and traditional machine learning, reinforced learning, deep Gaussian process, Laplace approximations and sampling techniques.

Once the integrated MBTE DTw model is generated at the box 52 and the UQ in the model is assessed at the box 54, the process enters a single vehicle loop 56 where a specific tail number and configuration model for a single air vehicle is identified at box 58. The UQ in the specific integrated model is assessed at box 60 and a sample point is identified at box 62 that determines where the next air vehicle test should be performed using a predetermined sample point protocol and the UQ that was assessed at the box 60, where the sample point can be a set of pertinent test variables or distinct aircraft configurations, such as one or more of an altitude, airspeed, atmospheric conditions, aircraft orientation, angle-of-attack (AoA), thrust/power level, fuel transfer/burn rates, external store carries, fuel distribution options, gear or trim/flap positions, etc. The size or range of the UQ identifies where the proper location in the flight envelope testing should be performed. For a first or early sample point, the sample point is usually taken from the heart of the flight envelope. The air vehicle is then flown to perform the test at the sample point and measurement data is obtained at box 64. The measurement data is added to the data set for the air vehicle, and an updated empirical model is generated. The updated empirical model is ensembled with the other available models, including the available engineering data, and a revised integrated MBTE DTw model is created at box 66. The process then determines if enough physical test of the vehicle has occurred to provide a reliable integrated model for that vehicle in the fleet. Specifically, the process determines if a predetermined stop testing condition has been met at decision diamond 68, where the stop testing condition is the size or range of the UQ, usually evaluated globally. For the first air vehicle of the fleet being tested, usually on the merits of the engineering models alone, uncertainty is high, and thus, the stop testing condition is generally not met.

If the stop testing condition is not met at the decision diamond 68, a new sample point is defined at the box 62, and the single vehicle iteration continues. Particularly, if the integrated model does not meet the stop testing condition at the decision diamond 68, vehicle testing iterates through the testing loop 56 with new and updated sample points at the box 62, air vehicle testing at the box 64 and updated integrated model at the box 66 until the stop testing condition is met at the decision diamond 68. As the integrated model improves and the assessed UQ becomes smaller, defining the next sample point at the box 62 allows fewer sample points and more strategic sample points to be used. As new air vehicles in the fleet are tested, the model reliability increases and the ensembled models are improved. Typically, as more air vehicles are tested from a fleet of vehicles the stop testing condition is met sooner and less testing needs to be performed.

If the integrated model is reliable enough to meet the stop testing condition at the decision diamond 68, the vehicle testing exits the testing loop 56, and the process goes back to the fleet loop sequence 48, where the process determines if all air vehicle configurations have been met at decision diamond 70. If all of the air vehicle configurations have been met at the decision diamond 70, then the process exits the fleet loop sequence 48 and stops at box 72 to publish tools for use. If all of the air vehicle configurations have not been met at the decision diamond 70, then the process archives the data from testing the air vehicle at box 74, and a revised historical model is updated for the fleet of vehicles with the new vehicle testing data at box 76. The revised historical model is included with the engineering models and other information to be ensembled to create an integrated MBTE DTw model at box 52 on which the UQ analysis can again be conducted at box 54 to be used for the vehicles being tested in the fleet.

Figure 3:
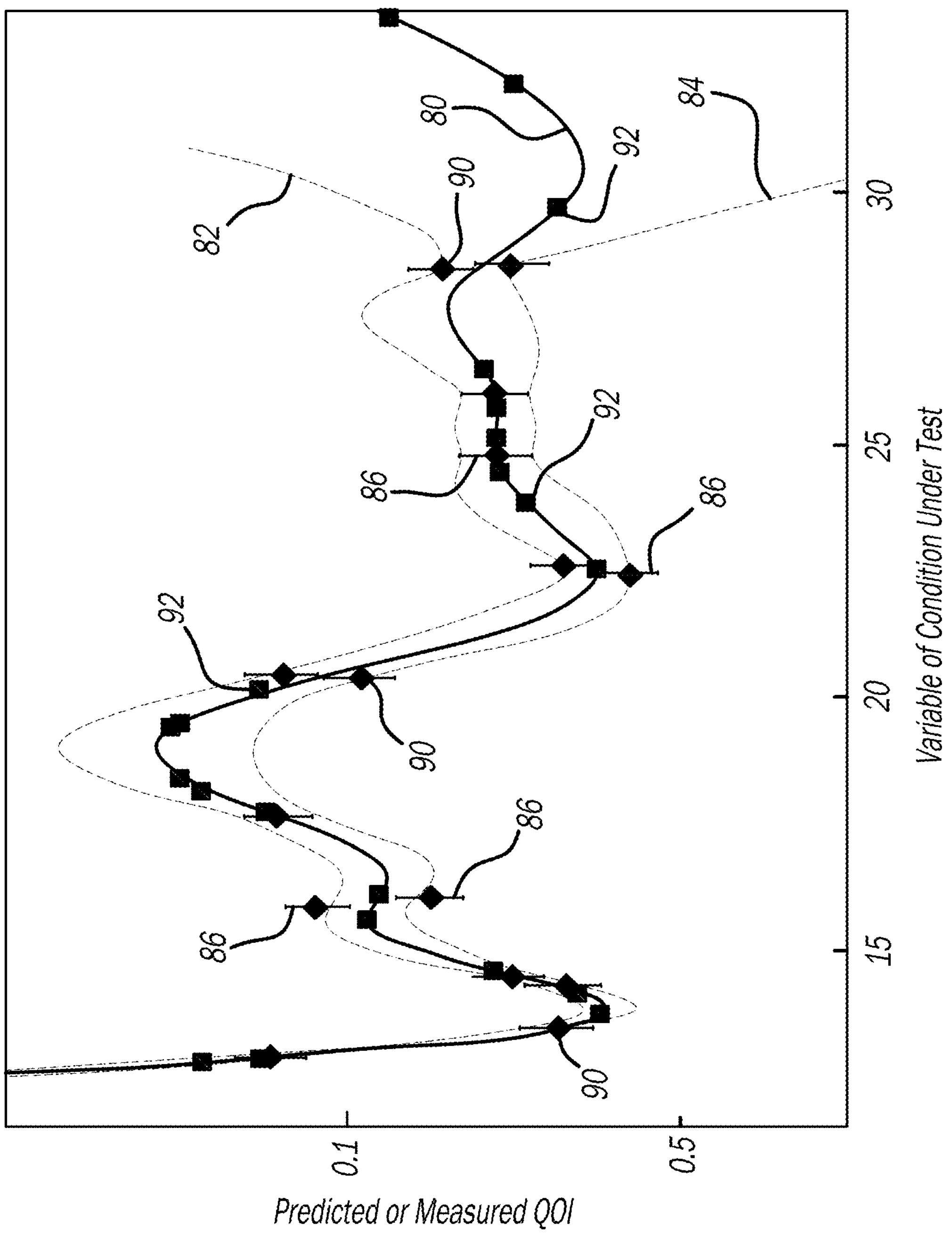
FIG. 3 is a graph with a test condition variable on the horizontal axis and the measured test point value on the vertical axis, which also shows the calibrated numeric ensemble model with uncertainty bounds overlayed.

FIG. 3 is a graph with a test condition variable. (X within the domain $\Omega_X$) on the horizontal axis and the calibrated model response $Y_{int}$ bounded by the uncertainty $\sigma$ on the vertical axis. Graph line 80 shows the calibrated numeric model, graph line 82 is a 1 sigma upper bound, graph line 84 is a −1 sigma lower bound and lines 86 illustrate an instrumental error and define the uncertainty quantification UQ. Points 88 are the actual test points from flying tests, diamond shaped points 90 are physical test points and square shaped points 92 are analytically evaluated points. The instrumental error addition for comparison is used to show where the model is strongest and testing may not be required and where the model may be the weakest and testing should be performed. For example, at those locations where the distance between the graph lines 82 and 84 is greater than the length of the line 86, testing may be required, and at those locations where the distance between the graph lines 82 and 84 is less than the length of the graph line 86, testing may not be required.

Figure 4:
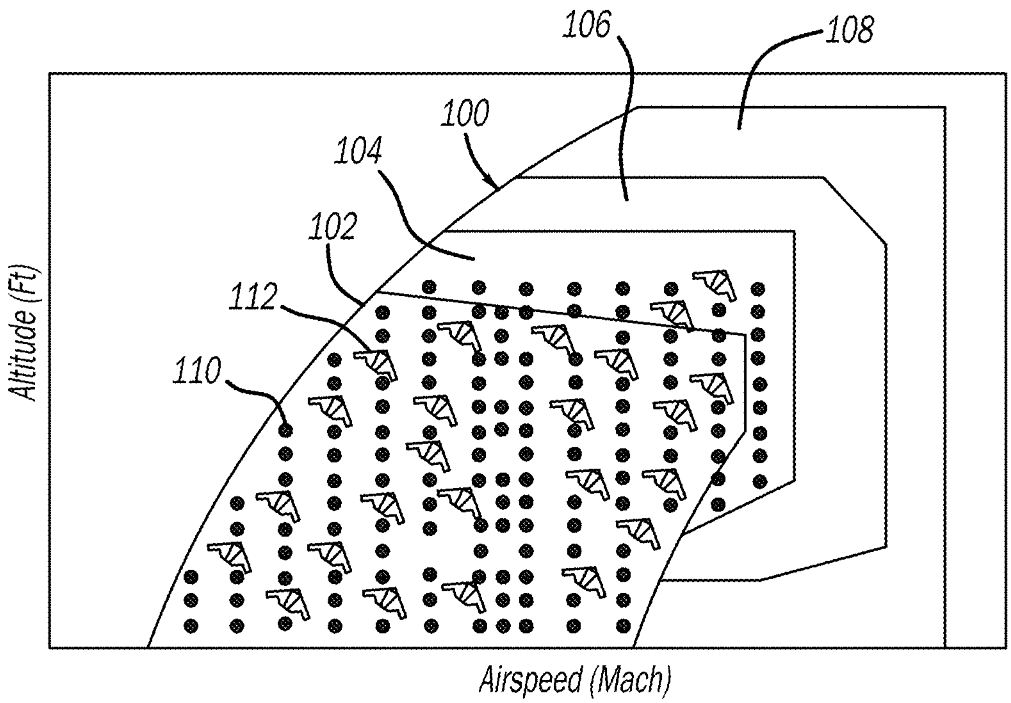
FIG. 4 is a graph with airspeed on the horizontal axis and altitude on the vertical axis showing a notional flight envelope of an aircraft and various testing points therein, some of which could be substituted and Certified by Analysis.
Figure 5:
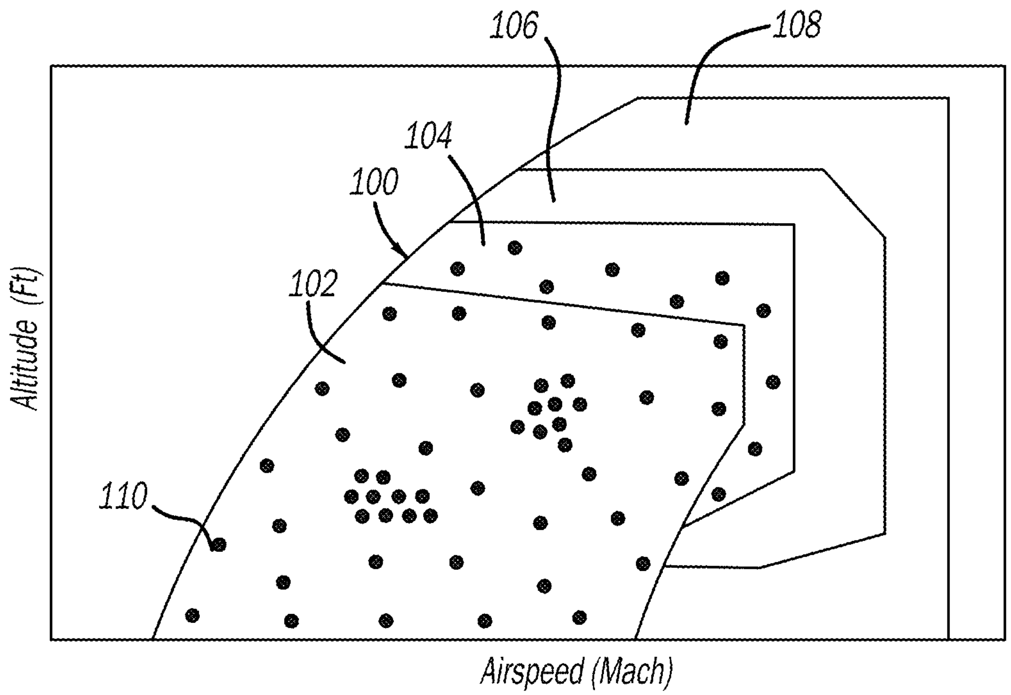
FIG. 5 is the graph shown in FIG. 4, but with fewer test points and optimized in such a way using design of experiments (DOE) as to most rapidly collect the flight test data needed to mature the model ensemble.

FIG. 4 is a graph with airspeed on the horizontal axis and altitude on the vertical axis showing a flight envelope 100 of an aircraft that includes a safe portion 102, a caution portion 104, and extreme caution portion 106 and a do not fly portion 108. and illustrating the impact of the calibrated numeric model uncertainty on air vehicle testing. A series of test points 110 are distributed within the portions 102 and 104 of the flight envelope 100 and represent airspeed and altitude points that test data of the aircraft is obtained. As is apparent, test data is obtained in a gridded manner with incremental steps in airspeed and altitude. By using the model technique discussed above, actual testing at each of the points 110 is not necessary in that the model accurately provides the test data at many of the points 110 so actual testing is not required. The model requires testing to be performed only at locations 112 in the flight envelope 100. Further, more efficient sampling of the entire envelope, and iterative improvements to the model, $Y_{int}$, and its cumulative uncertainty can be further enhanced by implementing the adaptive DOE techniques mentioned above. FIG. 5 shows the same graph as FIG. 4, but with a reduced number of the sample points 110 from using the ensembling technique discussed above.

The various processes discussed above relating to model ensembling can employ machine learning. Machine learning is a type of artificial intelligence that allows various software applications to become more accurate at predicting outcomes without being explicitly programmed to do so, where the machine learning algorithms use historical data as an input to predict new output values. One type of algorithm suitable for use in machine learning is an artificial neural network or neural network, taking inspiration from biological neural networks. An artificial neural network can learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

The machine learning model and neural networks may employ deep learning. Deep learning typically employs a software structure comprising several layers of neural networks that perform nonlinear processing, where each successive layer receives an output from the previous layer. Generally, the layers include an input layer that receives raw data from a sensor, a number of hidden layers that extract abstract features from the data, and an output layer that identifies a certain thing based on the feature extraction from the hidden layers. The neural networks include neurons or nodes that each has a "weight" that is multiplied by the input to the node to obtain a probability of whether something is correct. More specifically, each of the nodes has a weight that is a floating point number that is multiplied with the input to the node to generate an output for that node that is some proportion of the input. The weights are initially "trained" or set by causing the neural networks to analyze a set of known data under supervised processing and through minimizing a cost function to allow the network to obtain the highest probability of a correct output.

The model ensembling processors may include and/or employ deep learning, CNNs, RNNs, KNN, long short-term memory (LSTM) RNNs, decision tree learning, association rule learning, artificial neural networks, recurrent artificial neural networks, long short term memory networks, inductive logic programming, support vector learning and machines, clustering, Bayesian networks, reinforcement learning, representation learning, similarity and metric learning, sparse dictionary learning, genetic algorithms, machine learning acceleration logic, supervised neural network node training and learning, un-supervised neural network node training and learning, semi-supervised neural network node training and learning, shallow machine learning architectures, feature and image recognition, interference logic, logistic regression (LR), Naive-Bayes, random forest (RF), matrix factorization, etc.

A model architecture or neural network simulation model may be employed that is trained in an iterative training and testing loop. For example, features in the training test data are used to train the model based on weights and iterative calculations in which the target variable may be incorrectly predicted in an early iteration, where the model is tested. Subsequent iterations of the model training may be conducted with updated weights in the calculations. For example, the network nodes in the neural networks used by the machine learning model may be trained by training nodes in a neural network simulation model that employs supervised and/or unsupervised training data to process data and a target variable. Training the training nodes in the simulation model includes using an iterative training and testing loop that incorporates weights associated with the training nodes in the simulation model and iterative calculations that are tested, compared to the target variable and updated in subsequent iterative calculations to improve predictability of the target variable. Employing unsupervised learning means that the simulation model performs the training process using unlabeled data, i.e., without known output data with which to compare. The machine learning model can also be trained by clustering algorithms using unsupervised learning and clustering of data, performing a cluster model to group points based on similarities using unlabeled data, acquiring receiving data, and entering termed data ingestion. When versioning incoming data, if new data is subsequently collected and entered, a new model will be generated and preprocessing will be updated. Further, training the training nodes can include ingesting incoming data by cleaning and transforming the incoming data into a format that the neural network model architecture or machine learning model can digest. The incoming data can be versioned to connect a data snapshot with the model architecture, machine learning model or simulation model and as newly trained model architectures are tied to a set of versioned data, preprocessing steps are tied to the newly trained model, and if new data is subsequently collected and entered, a new model architecture is generated, and if the preprocessing is updated with newly ingested data, an updated model architecture is generated.

In one embodiment, the model ensembling processor transforms, via data cleaning, ingested data into a standardized training format for training machine learning models, and trains, using training test data in the standardized training format, an unsupervised neural network utilizing interconnected nodes. The training including inserting the training test data into an iterative training and testing loop to predict a target variable, and repeatedly predicting the target variable during multiple versions of the training and testing loop, each version of the multiple versions having differing weights applied to one or more nodes in one or more layers of the unsupervised neural network, each of the differing weights being updated with each of the multiple versions of the training and testing loop to reduce error in predicting the target variable, which improves predictability of the target variable and functionality of the unsupervised neural network. The unsupervised neural network is then deployed.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for sampling a flight envelope of an air vehicle under test, said method comprising:

obtaining engineering models of the air vehicle identifying how the air vehicle behaves;

obtaining empirical models of the air vehicle provided by measurement data taken from testing the air vehicle;

obtaining historical models of the air vehicle provided by measurement data taken from testing of other air vehicles related to the air vehicle;

ensembling the engineering models, the empirical models and the historical models into an integrated model;

assessing an uncertainty quantification of the integrated model to determine a reliability of the integrated model, where the uncertainty quantification is a bounding value;

determining a testing sample point of the air vehicle based on the uncertainty quantification, where the testing sample point includes a set of conditions;

testing the air vehicle at the testing sample point;

revising the integrated model and reassessing the uncertainty quantification evaluation based on test measurement data obtained during testing of the air vehicle;

determining if a stop testing condition has been met; and determining a new testing sample point of the air vehicle based on the uncertainty quantification, testing the air vehicle at the new testing sample point and revising the integrated model and reassessing the uncertainty quantification for each new sample point in an iterative manner if the stop testing condition is not met.

2. The method according to claim 1 further comprising stopping testing of the air vehicle and updating the historical model if the stop testing condition has been met.

3. The method according to claim 1 wherein revising the integrated model and reassessing the uncertainty quantification includes updating the empirical model with the data at each sample point.

4. The method according to claim 1 wherein assessing the uncertainty quantification includes using one or more of Monte Carlo type model input analysis to provide a range of numeric predictions, where deviations from expected nominal value can be systematic and/or random, where systematic includes observational, environmental and instrumental, and random includes theory and technique, a model theory that includes statistical, sensitivity and physical, where statistical includes sample-based, reliability-based and variance-based, an expression that includes probabilistic, scenario information and risk index, prediction horizon that includes ultra short term, short term and long term, AIT that includes deep learning, evolutionary algorithms and hybrid modeling, where deep Learning can include Bayesian techniques, such as Bayesian neural networks, Monte Carlo dropout, Markov chain Monte Carlo, Bayesian active learning, variational inference, Bayes by backprop and variational autoencoder, ensemble techniques, such as deep ensemble, deep ensemble Bayesian and traditional machine learning, reinforced learning, deep Gaussian process, Laplace approximations and sampling techniques.

5. The method according to claim 1 wherein the stop testing condition is determined based on the size of the uncertainty quantification and associated test instrumentation error.

6. The method according to claim 1 wherein the set of conditions includes one or more of altitude, airspeed, atmospheric conditions, air vehicle orientation, angle-of-attack (AoA), thrust/power level, fuel transfer/burn rates, external store carries, fuel distribution options, and gear or trim/flap positions.

7. The method according to claim 1 wherein the air vehicle is part of a fleet of air vehicles that are related to each other, and wherein each air vehicle maintains its own empirical model.

8. The method according to claim 7 wherein the historical model includes measurement data taken from testing of other air vehicles in the same class of air vehicles.

9. The method according to claim 8 further comprising determining if all air vehicle configurations for the fleet of air vehicles have been satisfied if the stop testing condition has been met and adding data from testing the air vehicle to the historical model of the fleet.

10. A system for sampling a flight envelope of an air vehicle under test, said system comprising:

a controller including at least one processor storing data and executable code that, when executed, causes the at least one processor to:

obtain engineering models of the air vehicle identifying how the air vehicle behaves;

obtain empirical models of the air vehicle provided by measurement data taken from testing the air vehicle;

obtain historical models of the air vehicle provided by measurement data taken from testing of other air vehicles related to the air vehicle;

ensemble the engineering models, the empirical models and the historical models into an integrated model;

assess an uncertainty quantification of the integrated model to determine a reliability of the integrated model, where the uncertainty quantification is a bounding value;

determine a testing sample point of the air vehicle based on the uncertainty quantification, where the testing sample point includes a set of conditions;

revise the integrated model and reassess the uncertainty quantification evaluation based on test measurement data obtained during testing of the air vehicle at the testing sample point;

determine if a stop testing condition has been met; and determine a new testing sample point of the air vehicle based on the uncertainty quantification and revise the integrated model and reassess the uncertainty quantification for each new sample point in an iterative manner if the stop testing condition is not met.

11. The system according to claim 10 wherein the at least one processor stops testing of the air vehicle and updates the historical model if the stop testing condition has been met.

12. The system according to claim 10 wherein revising the integrated model and reassessing the uncertainty quantification includes updating the empirical model with the data at each sample point.

13. The system according to claim 10 wherein assessing the uncertainty quantification includes using one or more of Monte Carlo type model input analysis to provide a range of numeric predictions, where deviations from expected nominal value can be systematic and/or random, where systematic includes observational, environmental and instrumental, and random includes theory and technique, a model theory that includes statistical, sensitivity and physical, where statistical includes sample-based, reliability-based and variance-based, an expression that includes probabilistic, scenario information and risk index, prediction horizon that includes ultra short term, short term and long term, AIT that includes deep learning, evolutionary algorithms and hybrid modeling, where deep Learning can include Bayesian techniques, such as Bayesian neural networks, Monte Carlo dropout, Markov chain Monte Carlo, Bayesian active learning, variational inference, Bayes by backprop and variational autoencoder, ensemble techniques, such as deep ensemble, deep ensemble Bayesian and traditional machine learning, reinforced learning, deep Gaussian process, Laplace approximations and sampling techniques.

14. The system according to claim 10 wherein the stop testing condition is determined based on the size of the uncertainty quantification and associated test instrumentation error.

15. The system according to claim 10 wherein the set of conditions includes an altitude and airspeed of the air vehicle.

16. The system according to claim 10 wherein the air vehicle is part of a fleet of air vehicles that are related to each other, and wherein each air vehicle maintains its own empirical model.

17. The system according to claim 16 wherein the historical model includes measurement data taken from testing of other air vehicles in the same class of air vehicles.

18. The system according to claim 17 wherein the at least one processor determines if all air vehicle configurations for the fleet of air vehicles have been satisfied if the stop testing condition has been met, and adding data from testing the air vehicle to the historical model of the fleet.

19. A method for sampling a flight envelope of an air vehicle under test, said method comprising:

obtaining a plurality of models of the air vehicle;

ensembling the models into an integrated model;

assessing an uncertainty quantification of the integrated model to determine a reliability of the integrated model, where the uncertainty quantification is a bounding value;

determining a testing sample point of the air vehicle based on the uncertainty quantification, where the testing sample point includes a set of conditions;

testing the air vehicle at the testing sample point;

revising the integrated model and reassessing the uncertainty quantification evaluation based on test measurement data obtained during testing of the air vehicle;

determining if a stop testing condition has been met; and determining a new testing sample point of the air vehicle based on the uncertainty quantification, testing the air vehicle at the new testing sample point and revising the integrated model and reassessing the uncertainty quantification for each new sample point in an iterative manner if the stop testing condition is not met.

* * * * *